United States Patent [19]
Jeon

[11] Patent Number: 5,982,505
[45] Date of Patent: Nov. 9, 1999

[54] TECHNIQUE FOR CONTROLLING THE OUTPUT OF A FACSIMILE MACHINE

[75] Inventor: Seon-A Jeon, Suwon, Rep. of Korea

[73] Assignee: SamSung Electronics Co., Ltd., Suwon, Rep. of Korea

[21] Appl. No.: 08/845,179

[22] Filed: Apr. 21, 1997

[30] Foreign Application Priority Data

Apr. 19, 1996 [KR] Rep. of Korea ................ 96-11962

[51] Int. Cl.$^6$ ..................................... H04N 1/00
[52] U.S. Cl. ............................. 358/404; 358/468
[58] Field of Search .................. 358/405, 434, 358/468, 400, 404; 380/18, 20; 178/17 R; 370/402

[56] References Cited

U.S. PATENT DOCUMENTS

| | | | |
|---|---|---|---|
| 4,736,074 | 4/1988 | Sendlinger et al. ................ 178/17 R |
| 4,912,761 | 3/1990 | Tan et al. . | |
| 5,163,088 | 11/1992 | LoCascio . | |
| 5,224,156 | 6/1993 | Fuller et al. . | |
| 5,339,174 | 8/1994 | Harris ...................................... 358/442 |
| 5,351,136 | 9/1994 | Wu et al. . | |
| 5,353,124 | 10/1994 | Chou et al. . | |
| 5,392,336 | 2/1995 | Chang et al. . | |
| 5,406,387 | 4/1995 | Yamamoto . | |
| 5,452,099 | 9/1995 | Von Meister . | |
| 5,552,897 | 9/1996 | Mandelbaum et al. ............. 358/400 |
| 5,587,799 | 12/1996 | Kawamura et al. ................ 358/296 |
| 5,677,910 | 10/1997 | Delaney ............................... 370/402 |

*Primary Examiner*—Joseph Mancuso
*Assistant Examiner*—Vikkram Bali
*Attorney, Agent, or Firm*—Robert E. Bushnell, Esq.

[57] ABSTRACT

A facsimile machine has an enable or disable mode of security receiving selected and a password inputted if its memory is full in order to print additionally inputted data on paper. After this processing, a waiting time of printing output is inputted and the number of retrying input of a password is counted. Memory data received and stored is printed according to counting of retrying input of a password, and inputting a password or no password is designated. After output of memory data which has been received and stored, a receiving mode and a range of automatic switching of the receiving mode are selected. Without installing any additional hardware devices, secure and convenient receiving of data through a facsimile machine can be obtained.

5 Claims, 11 Drawing Sheets

Fig. 1

| | | |
|---|---|---|
| PRESENT TIME +0 | HH(BCD) | — 1 |
| PRESENT TIME +1 | MM(BCD) | — 2 |
| BEGINNING TIME OF MEMORY RECEIVING +0 | HH(BCD) | — 3 |
| BEGINNING TIME OF MEMORY RECEIVING +1 | MM(BCD) | — 4 |
| FINISHING TIME OF MEMORY RECEIVING +0 | HH(BCD) | — 5 |
| FINISHING TIME OF MEMORY RECEIVING +1 | MM(BCD) | — 6 |
| AUTOMATIC OUTPUT TIME OF MEMORY RECEIVING +0 | HH(BCD) | — 7 |
| AUTOMATIC OUTPUT TIME OF MEMORY RECEIVING +1 | MM(BCD) | — 8 |
| PASSWORD +0 | * * (BCD) | — 9 |
| PASSWORD +1 | * * (BCD) | — 10 |
| INDICATION OF REMAINING MEMORY +0 | (BCD) | — 11 |
| TOTAL NUMBER OF CALLS RECEIVED BY MEMORY | (ASCII) | — 12 |
| TOTAL NUMBER OF PAGES RECEIVED BY MEMORY | (ASCII) | — 13 |
| OPTION FLAG | (BIT) | — 14 |

TECHNIQUE FOR CONTROLLING THE OUTPUT OF A FACSIMILE MACHINE

CLAIM OF PRIORITY

This application makes reference to, incorporates the same herein, and claims all benefits accruing under 35 U.S.C. §119 from an application for METHOD FOR CONTROLLING THE OUTPUT OF A FACSIMILE MACHINE AND SYSTEM THEREFOR earlier filed in the Korean Industrial Property Office on the 19th day of Apr. 1996 and there duly assigned Ser. No. 11962/1996, a copy of which application is annexed hereto.

BACKGROUND OF THE INVENTION

1. Field of the Invention

The present invention concerns a technique for controlling the output of a facsimile machine, and more particularly a technique for enabling selective output of data received by a facsimile machine at a particular time for security purposes.

2. Description of the Related Art

Generally in a facsimile machine, data sent by a sender is outputted as is if there is enough paper and the system is set in an automatic receiving mode. If there is no paper or the machine is not capable of receiving data due to jamming or other faults, data is stored in a memory and is automatically printed once paper is supplied. This method does not create any problems if data is received directly by a receiver; however, if the data was confidential and there was no one near the receiving facsimile machine, data would be exposed without being secured, thus imposing a security problem.

The Chou et al. patent, U.S. Pat. No. 5,353,124, entitled Method Of Providing Confidential Treatment For Facsimile Transmissions, discloses a method of providing confidential treatment for facsimile transmissions which places a received message in storage rather than printing it out upon a determination that a key is present in the message. The message may be printed out using a password.

The Mandelbaum et al. patent U.S. Pat. No. 5,552,897, entitled Secure Communication Apparatus And Method, discloses a facsimile machine in which a password followed by the insertion of a user's smart card must be enetered into the receiving apparatus prior to displaying or printing out a restricted facsimile message.

The Kawamura et al., patent U.S. Pat. No. 5,587,799, entitled Copying Machine With Reserved Copying At A Predetermined Time Period, discloses a copying machine in which a scanned document is printed at a predetermined selected time.

The following patents each disclose features in common with the present invention but do not disclose the specifically recited method of controlling the output of a facsimile machine for enabling selective output of printed data received through a facsimile machine at a particular time for security purposes of the present invention.

U.S. Pat. No. 5,452,099 to Von Meister, entitled Method And System For Storage And/Or Transmission Of Confidential Facsimile Documents, U.S. Pat. No. 5,406,387 to Yamamoto, entitled Facsimile Apparatus Capable Of Preventing Receipt Of Unauthorized Facsimile Transmissions, U.S. Pat. No. 5,392,336 to Chang et al., entitled Data Message Storage And Pick Up Service, U.S. Pat. No. 5,351,136 to Wu et al., entitled Facsimile Apparatus And Method For Sending And Receiving Private Infornation, U.S. Pat. No. 5,339,174 to Harris, entitled Facsimile Machine Time Shifting And Converting Apparatus, U.S. Pat. No. 5,224,156 to Fuller et al., entitled Method And Apparatus For Facsimile Enhancement, U.S. Pat. No. 5,163,088 to LoCascio, entitled Facsimile Security System, and U.S. Pat. No. 4,912,761 to Tan et al., entitled Security Facsimile Systems.

SUMMARY OF THE INVENTION

It is therefore an object of the present invention to provide a technique in which received data is automatically outputted at a particular time set by a receiver or is stored in a memory when the machine reads the information which has been received.

It is another object of the invention to provide a technique in which data received and stored in a memory can only be outputted if a password or a release mode of inputting established for security purposes is given correctly.

In accordance with the invention, a method of producing an output of a facsimile machine comprises the steps of presetting a designated time for storing received data in a memory to maintain security up to said designated time, printing the stored data on paper upon reaching said designated time, and optionally designating each of the functions.

In one aspect of the present invention, a method of producing an output of a facsimile machine also comprises the steps of: selecting either a memory receiving function or a paper receiving function by operating a specific key (security key) so as to maintain security, outputting the received data stored in the memory by operating the security key and inputting a password, and optionally designating each of the functions.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Figure 1:
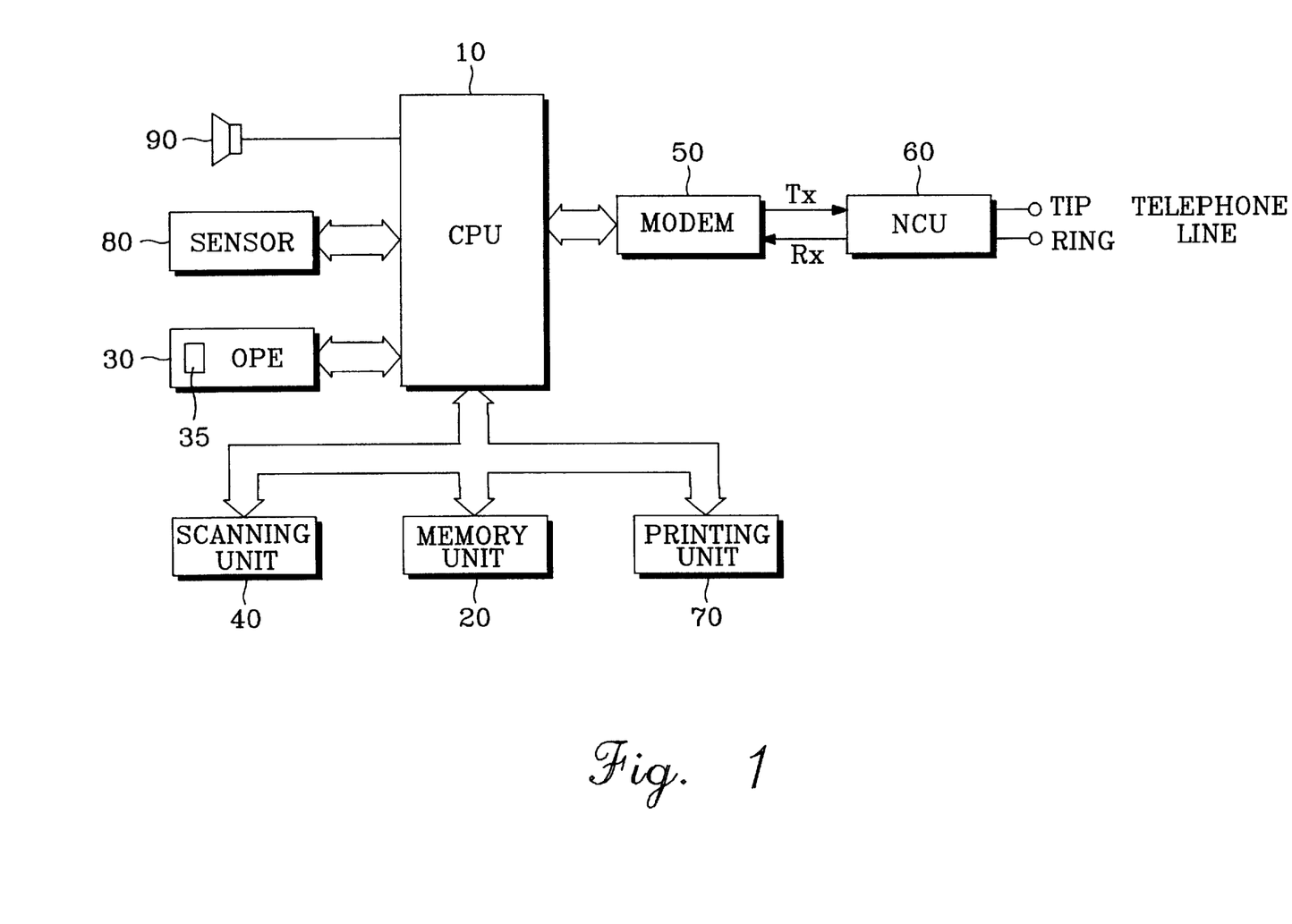
FIG. 1 is a systematic diagram of a facsimile machine showing its inner structure.

FIG. 1 is a systematic diagram of a facsimile machine of the present invention in which facsimiles are generally controlled by a central processing unit 10 (CPU) according to a given program. A memory unit 20 has operation programs and general control programs of the CPU 10, and stores data processed according to the programs of the CPU 10. An OPE (operating panel) 30 has a plurality of keys, inputs key data to the CPU 10 when the keys are pressed, and indicates the operating state of the system in an indication window 35 according to indication data of the CPU 10. A scanning unit 40 scans original papers, converts pictorial images of original papers into digital data, and inputs them into the CPU 10. A modem 50 modulates and demodulates input/output signals of the CPU 10. An NCU (network control unit) 60 forms an interface between a TIP and RING of a telephone line and a modem under the control of the CPU 10; a printing unit 70 prints information outputted from the CPU 10; and a sensor 80 provides information as to the state of original and recorded papers to the CPU 10. A speaker 90 generates information through control signals corresponding to information from the CPU 10.

Figure 2:
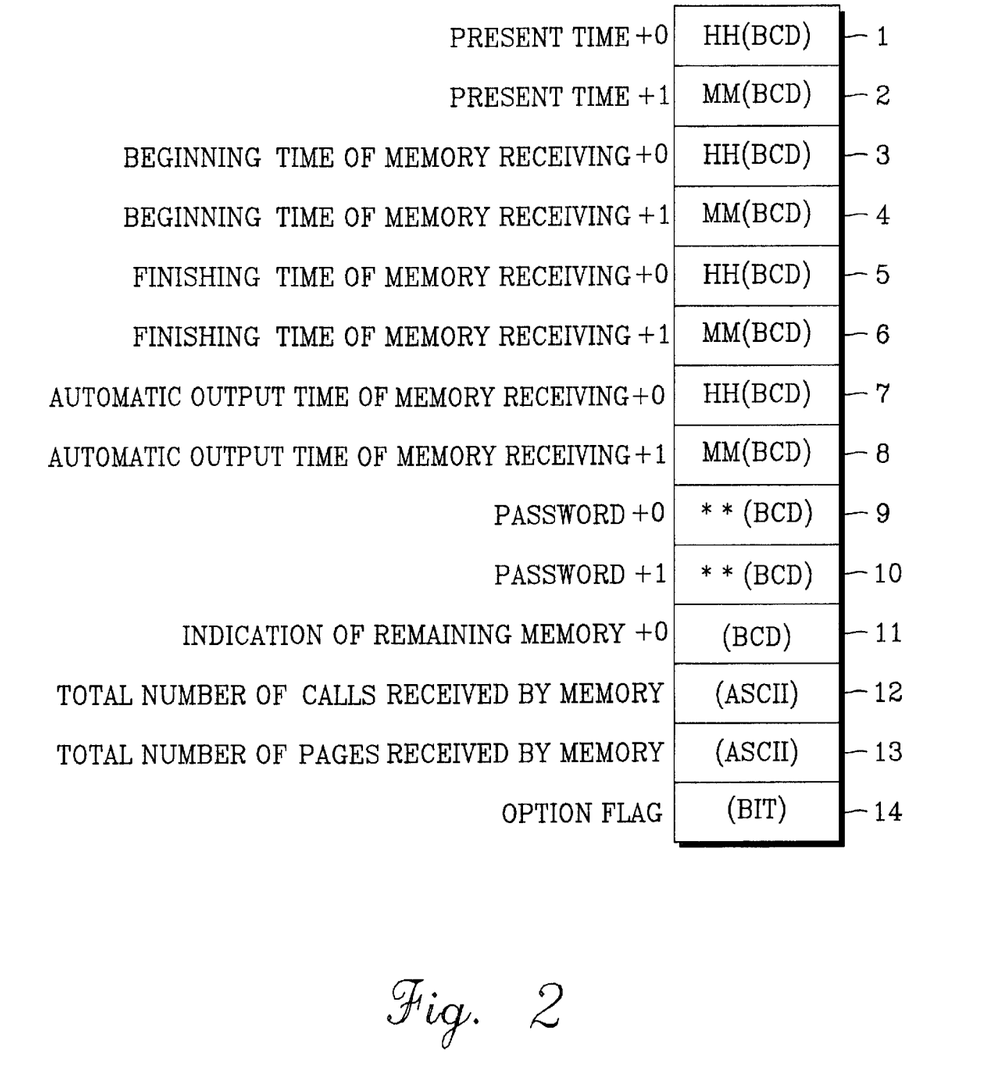
FIG. 2 is a memory map diagram of each function performed in an embodiment of the present invention.

FIG. 2 is a memory map diagram of functions performed according to an embodiment of the present invention. Reference numerals 1 and 2 represent zones designated to indicate the present time, which read and store the present time in the chips of a clock by a unit of 5–10 ms at time interrupt and show it in the form of hours and minutes (HHMM, for example 0930). Reference numerals 3 and 4 represent zones designating the beginning time of conversion of a general paper receiving mode to a memory receiving mode. Reference numerals 5 and 6 represent zones designating the time to complete the memory receiving mode. At this time begins the conversion of a memory receiving mode to a paper receiving mode.

Reference numerals 7 and 8 represent zones designating the time to output data received by the memory receiving mode. This time is a portion to be inputted by a user in the form of "HH:MM" to show "hours and minutes" in a 24 hour format. This is the case in which image data received automatically by a memory is outputted automatically if the time is identical with the present time. Passwords represented by reference numerals 9 and 10 are the zones inputted when data received and stored in the memory is outputted, and four letters or numbers in BCD code are used.

Reference numeral 11 is a zone designating an indication of the remaining capacity of the memory, which is processed as an ASCII code. The remaining memory after receiving with respect to the entire memory is recalculated in percent and is shown by an LCD indication device. Reference numeral 12 represents memory in which all calls received are processed as an ASCII code, and reference numeral 13 is memory in which all pages received are processed as an ASCII code. Reference numeral 13 represents an option flag which is depicted in FIG. 3.

Figure 3:
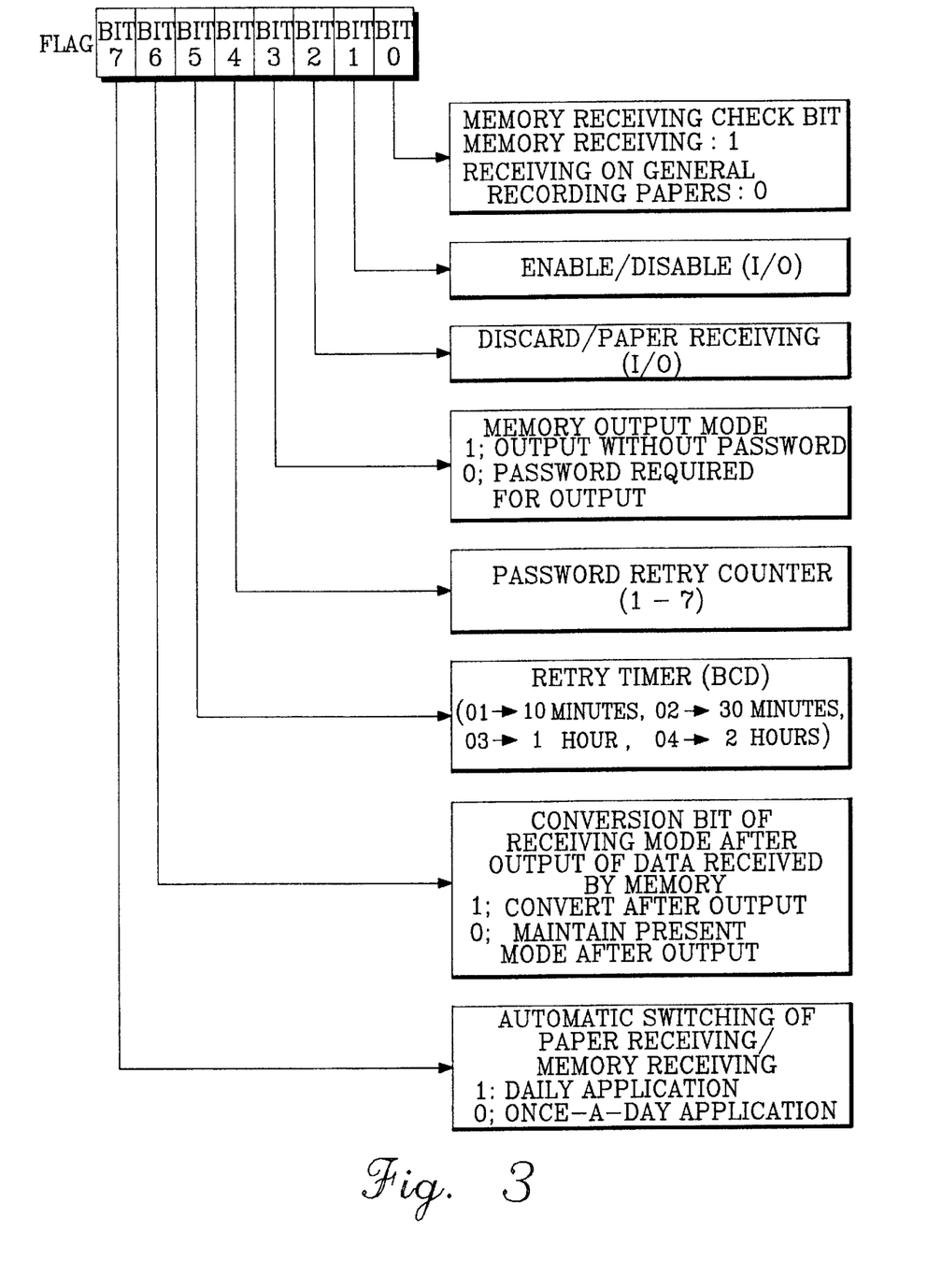
FIG. 3 is a diagram showing an option flag of the memory map diagram shown in FIG. 2.

FIG. 3 is an option flag in the memory map of FIG. 2, in which information received is processed by paper receiving if BIT 0 is 0, and is processed by memory receiving if BIT 0 is 1.

BIT 1 is a bit for determining whether or not to perform a conversion function of an output mode by pressing a particular key, and BIT 2 is a bit for determining whether to discard or to paper-receive additional data when the corresponding memory is full and is unable to receive any further data.

BIT 3 has two modes: one mode (having value 0) is for a case where a password has to be inputted when data received and stored in the memory is to be outputted by paper receiving; and another mode (having value 1) is for a case where a password does not have to be inputted for a data output.

BIT 4 is a bit for inputting a password to output data received and stored in the memory if there is any, and allows for seven trials if the above password is not correct.

BIT 5 is a bit for determining that the present user is an unauthorized user who does not know the password when a correct password selected from among all allowable passwords has not been inputted into a retrying counter. This bit shows a time value during which output is restricted.

BIT 6 is a bit converting the receiving mode after data received and stored in the memory is outputted, where 1 refers to a case of converting receiving mode after output, while 0 refers to a case of maintaining the present mode after output.

BIT 7 is a bit showing ranges of automatic switching and automatic output according to the time of paper receiving or memory receiving, where 1 refers to applying everyday, while 0 refers to applying once a day.

Figure 4:
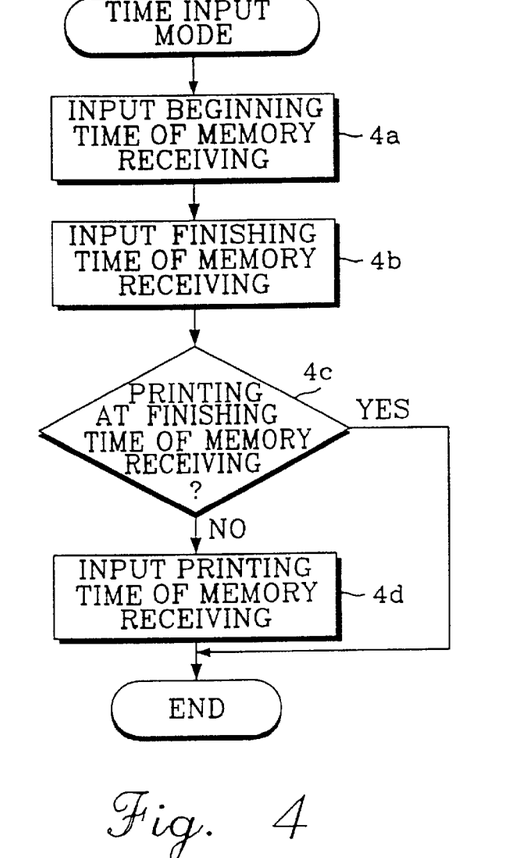
FIG. 4 is a flowchart of a time input mode showing how it is processed according to an embodiment of the present invention.

FIG. 4 is a flowchart of a time input mode of the present invention, which is comprised of a first step of inputting a beginning time of memory receiving, a second step of inputting a completion time of memory receiving, and a third step of finishing printing if data is to be printed, or inputting a printing time of data received by memory receiving if data is not to be printed, at the time of completion of memory receiving.

In FIG. 4, step 4a is for inputting a desired time of memory receiving in a 24 hour format through an OPE 30. An input format is "HH:MM" in which four numbers are inputted by using ten keys. For example, if data is not to be received after work, "18:00" is inputted. Step 4b is for inputting a completion time of memory receiving. For example, if output is desired after returning to work in the morning, "09:00" is inputted. Step 4c is for selecting whether to output automatically while being converted to a paper receiving mode at the time of completion of memory receiving (YES), or to output at a particular time after memory receiving (NO). Step 4d is for outputting data at a particular time a user wants irrespective of the time of memory receiving. For example, this mode is converted automatically into a paper receiving mode at 9 am (09:00), and data received and stored in the memory is to be outputted as a package at 10:30 am (10:30).

Figure 5:
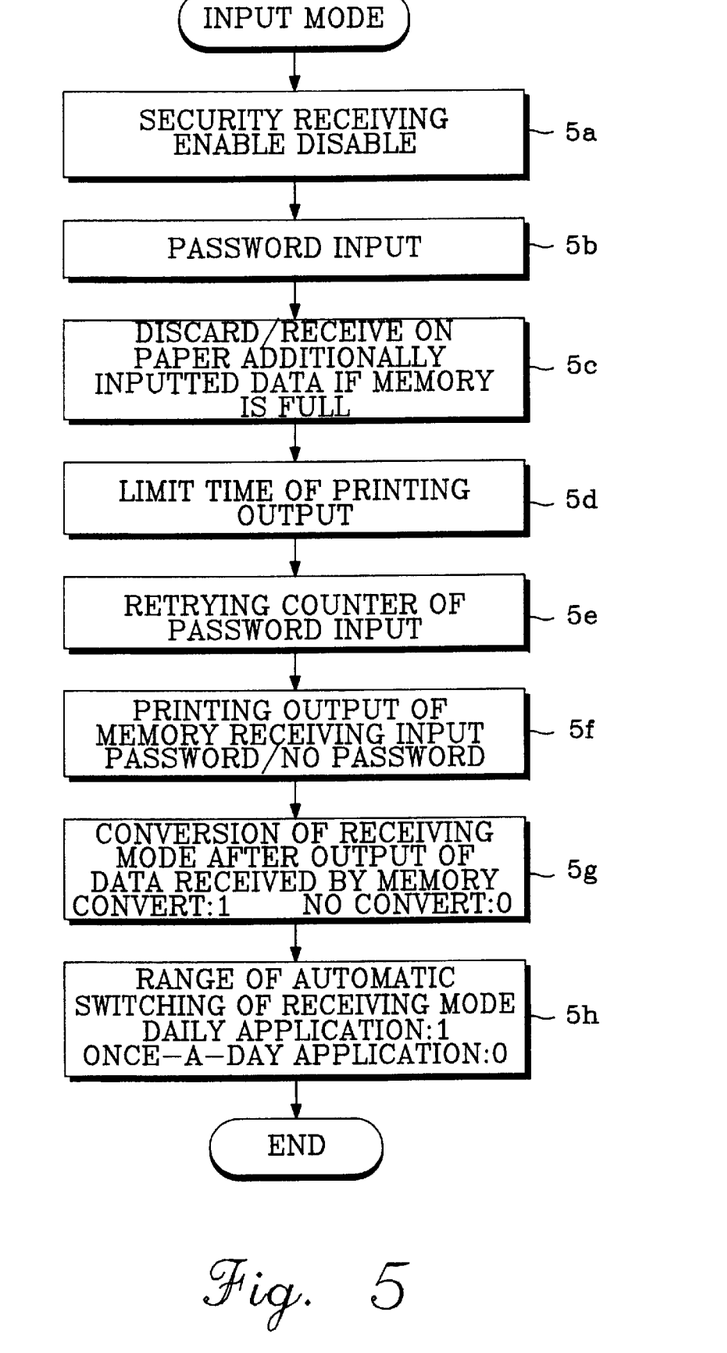
FIG. 5 is a flowchart of an input mode showing how its option flag bit is processed according to an embodiment of the present invention.

Referring to FIG. 5, a process for the input mode comprises the steps of selecting either enable or disable of security receiving, inputting a password for security, selecting to discard or to paper-receive papers additionally received and inputted when the memory is full during memory receiving, inputting a time limit of output for a certain time as well as inputting a counting value of retrying input of the password when the password is not correct in an output mode, determining whether to input a password at the time of printing data received by memory, and determining a receiving mode after receiving memory outputted as well as whether or not to automatically disconnect the receiving mode.

Figure 6:
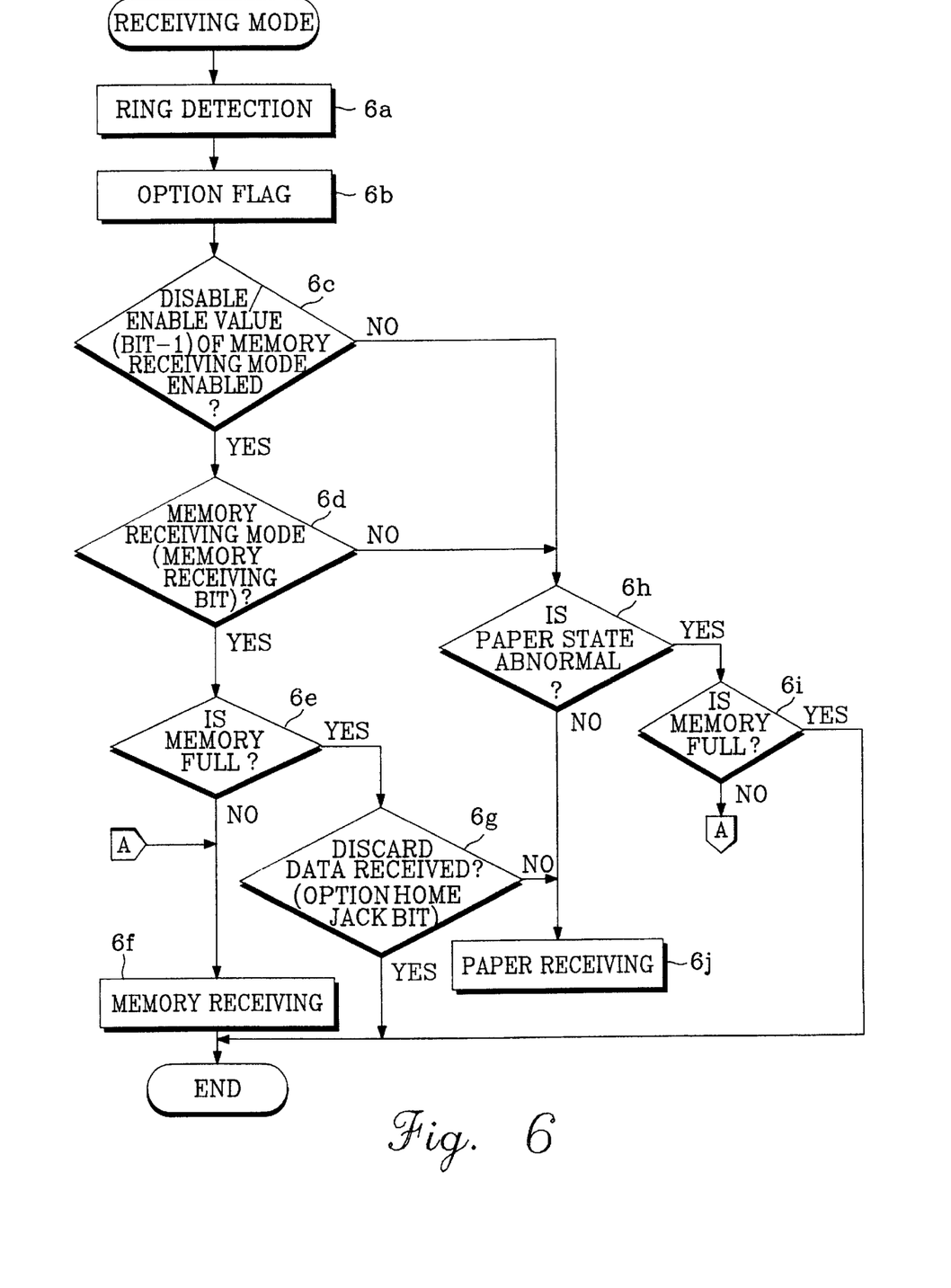
FIG. 6 is a flowchart of a receiving mode showing how a call is processed according to an embodiment of the present invention.

Referring to FIG. 6, a process of the receiving mode comprises the steps of detecting the mode enable for checking whether the value of memory receiving mode enable/disable is enable by detecting a ring from a receiving mode and bringing in an option flag if any is detected, confirming the memory receiving mode for ascertaining whether it is in the memory receiving mode if the value is in an enabled state during detection of the above mode able, checking the memory state for determining if the memory is fall when it is in the memory receiving mode during the confirmation step of the memory receiving mode, checking the paper state for ascertaining whether there is any fault for paper setting when the value is in a disabled state and it is not in the memory receiving mode, receiving the data of the memory in the paper when the paper state is normal or otherwise checking whether or not memory is full, and ending the operation or printing the received data on the paper according to whether or not the received data is to be discarded when the memory is full.

Figure 7:
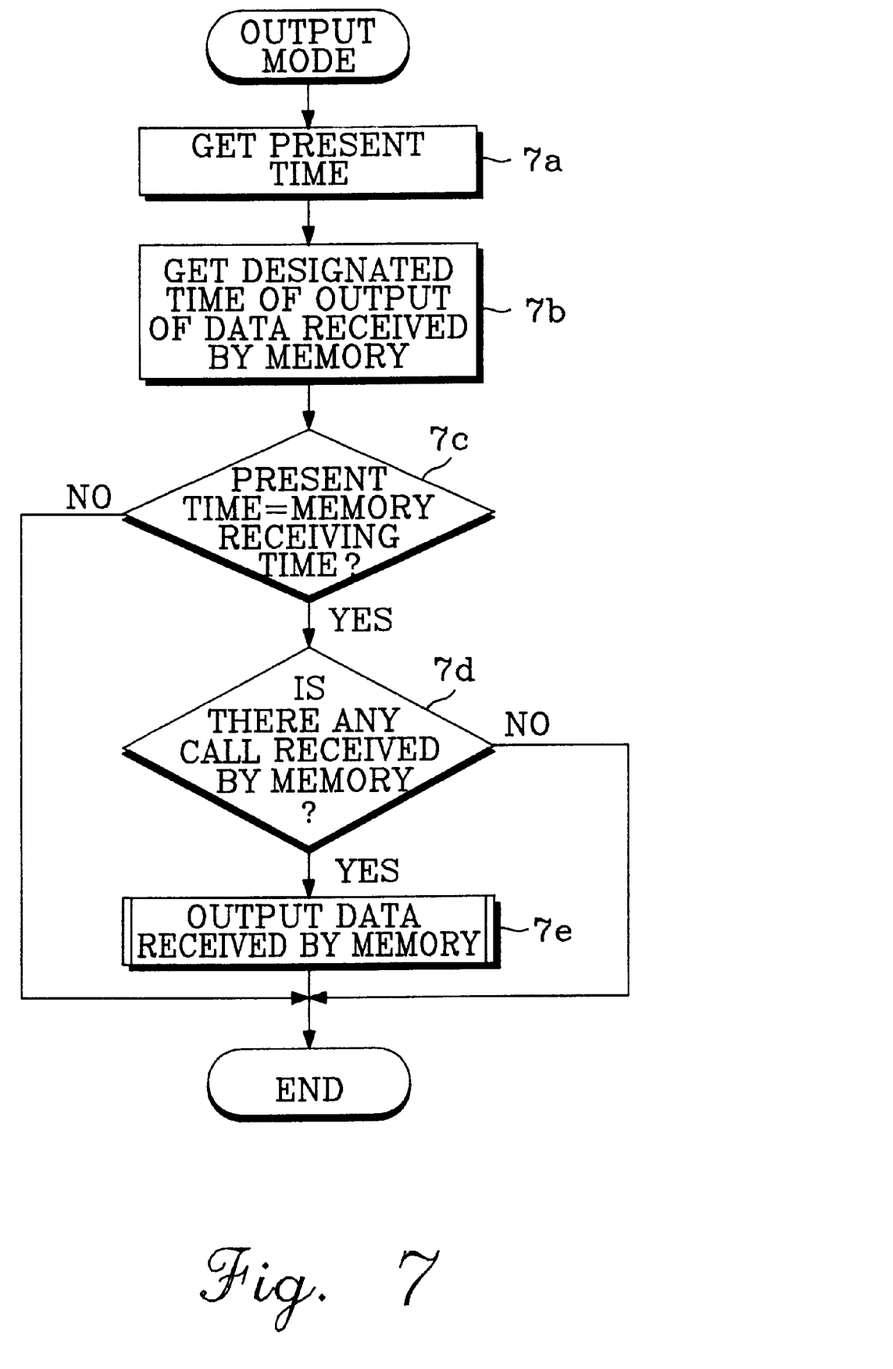
FIG. 7 is a flowchart of an output mode showing how image data designated by a memory is outputted according to an embodiment of the present invention.

Referring to FIG. 7, a process of the output mode comprises the steps of checking if the present time and the designated time for outputting the received data from the memory agree with each other, and outputting the data received from the memory if there is a call after checking the total number of calls.

Now an embodiment of the present invention is described in more detail with reference to FIGS. 1 through 7. FIG. 5 is a flowchart of an input mode in relation to bits of an option flag in FIG. 3. In step 5a, the CPU 10 inputs an able/disable signal, which is a security receiving input of BIT 1 for handling an option flag in the memory unit 20 through the OPE 30 for setting; while in step 5b, the CPU 10 receives and stores a password through the OPE 30. After inputting a password in step 5b, the CPU 10 in step 5c checks if the memory is full and determines whether to discard or to paper-receive additionally inputted papers if it is full. After it is determined to discard or to paper-receive, in step 5d output waiting times are set at 10 minutes, 30 minutes, 1 hour, and 2 hours. From the output limit times set in step 5d, a password is inputted and retrials are counted in step 5e, and in step 5f, it is confirmed whether or not to input a password in order to print data received and stored in the memory. In step 5g, the receiving mode conversion bit after the output of data received and stored in the memory is set to "1" for conversion after output or to "0" for maintaining the present mode after output. In step 5h, the range of automatic switching of receiving mode is set to "1" for daily application or to "0" for once-a-day application.

FIG. 6 is a flowchart of a receiving mode of the present invention. In step 6a, the CPU 10 detects a ring; an option flag set in FIG. 5 is brought to the memory unit 20 in step 6b; and whether the value of the memory receiving mode enable/disable signal is enabled is checked in step 6c. In step 6c, the CPU 10 confirms whether the value of the memory receiving mode disable/enable signal is enabled. If the value is enabled in step 6c, it is determined if the mode is the memory receiving mode in step 6d. If it is determined to be in the memory receiving mode in step 6d, whether the memory is full is checked in step 6e. If memory is not full in step 6e, data is received and stored in the memory and processed so as to be completed in step 6f. If the memory is full, whether to discard received data is checked in step 6g. If data received is to be discarded, then the process is completed; and if it is not to be discarded, the data is received on paper, in step 6j. In case the disable/enable value of the memory receiving mode is not enabled in step 6c or it is not in the memory receiving mode in step 6d, whether there is any fault in setting papers is checked in step 6h. After checking of an abnormality in paper setting in step 6h, if there is a fault such as jamming, no paper, etc., whether the memory is full is checked in step 6i; or if there is no fault, data is received on paper in step 6j. If the memory is full in step 6i, the process is completed, while if it is not full, original data is received by the memory unit 20 in step 6f.

FIG. 7 is a flowchart of an output mode of the present invention, in which a method of outputting image data stored in the memory unit 20 is shown. In a memory map, the present time is updated to be at the present position to have the present clock value by reading the clock value at a constant interval of 5 ms or 10 ms by a clock chip within a circuit in step 7a. This value is received by the CPU 10, and is compared with an automatic output time of memory receiving which was obtained in step 7b, in step 7c. If they do not agree, the process is completed at an output mode; while if they coincide, whether there is any call received by the memory is checked in step 7d. If there is no call received, the process is completed; while if there is a call, output of data received and stored in the memory is accomplished in step 7e. After output of data, the memory receiving mode is released automatically, and it is optional to convert to a paper receiving mode or to remain as is.

Figure 8:
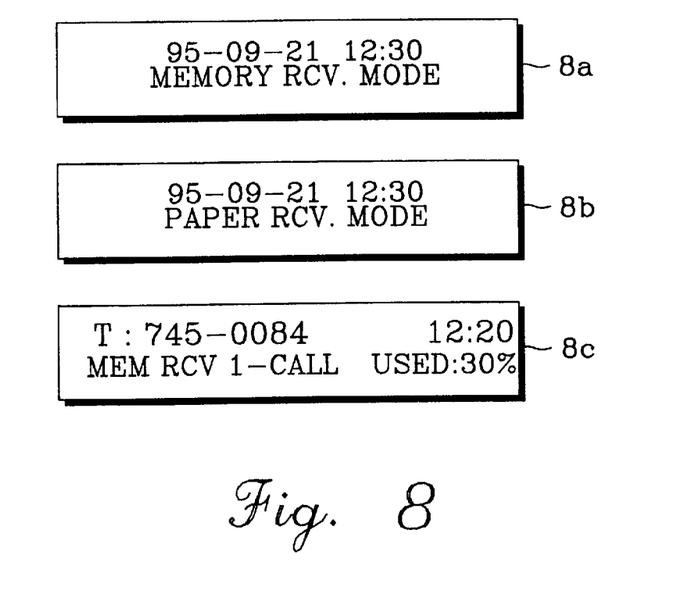
FIG. 8 is a diagram showing function indication of an indication unit according to an embodiment of the present invention.

In FIG. 8, reference numerals 8a and 8b refer to a memory receiving mode and a paper receiving mode, respectively, on an OPE 30. In order to convert a memory receiving mode to a paper receiving mode, a correct password has to be inputted for security purposes by pressing a particular key, i.e., a security key; whereas in order to convert a paper receiving mode to a memory receiving mode, a password may be or may not be inputted so that a user can select a mode of input. Reference numeral 8c refers to memory where messages in a waiting state are shown on an LCD of an OPE 30 in an order of receiving once data has been received. At this time, the telephone number of the last sender, received time, the total amount of data, and the amount of memory used in percent are indicated. In order to confirm where the data has been sent from, left-and-right keys as well as up-and-down keys are pressed to have an LCD similar to the third LCD. The above memory receiving mode and paper receiving mode are stored in a static ram (S-RAM) so that they are not changed even when power is turned on or off. Image data stored in a D-RAM is data which may be erased at any time. This data shows the sender, number of pages, received time, etc. or data reporting a power failure (in case of a power failure). The power failure report data is for finding and reporting which data has been erased during a poweroff period by outputting the number of receiving, time, etc. of the telephone number of the sender received by the memory. Operation of the present invention described above is applicable to both a telephone mode (TEL MODE) and an automatic receiving mode (AUTO RCV MODE) as well as a telephone mode (TEL MODE) and a facsimile mode (FAX MODE).

As another embodiment of the invention, there is a method of converting a paper receiving mode to a memory receiving mode simply by using a particular key. Outputting data received by memory can be done by pressing a particular key, however, it can be also done by inputting a particular password. In order to do this, the memory unit 20 is set to perform the function shown in FIG. 9.

Figure 9:
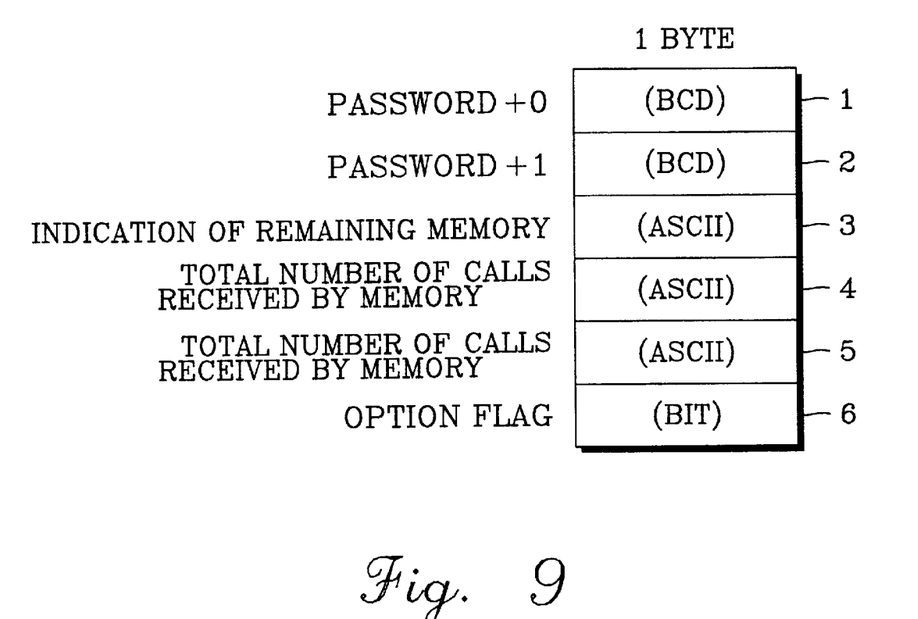
FIG. 9 is a memory map diagram showing passwords as well as all calls and pages received by the memory according to another embodiment of the present invention.

In FIG. 9, reference numerals 1 and 2 refer to passwords which are codes inputted when data received by memory are to be outputted, and reference numeral 3 is for indicating the remaining capacity of memory in ASCII code, which is an amount of remaining memory calculated in percent and shown on an LCD indication device. Reference numeral 4 is for indicating the total number of calls received by memory in ASCII code, and reference numeral 5 is for showing the number of total pages received by memory. Reference numeral 6 is an option flag.

Figure 10:
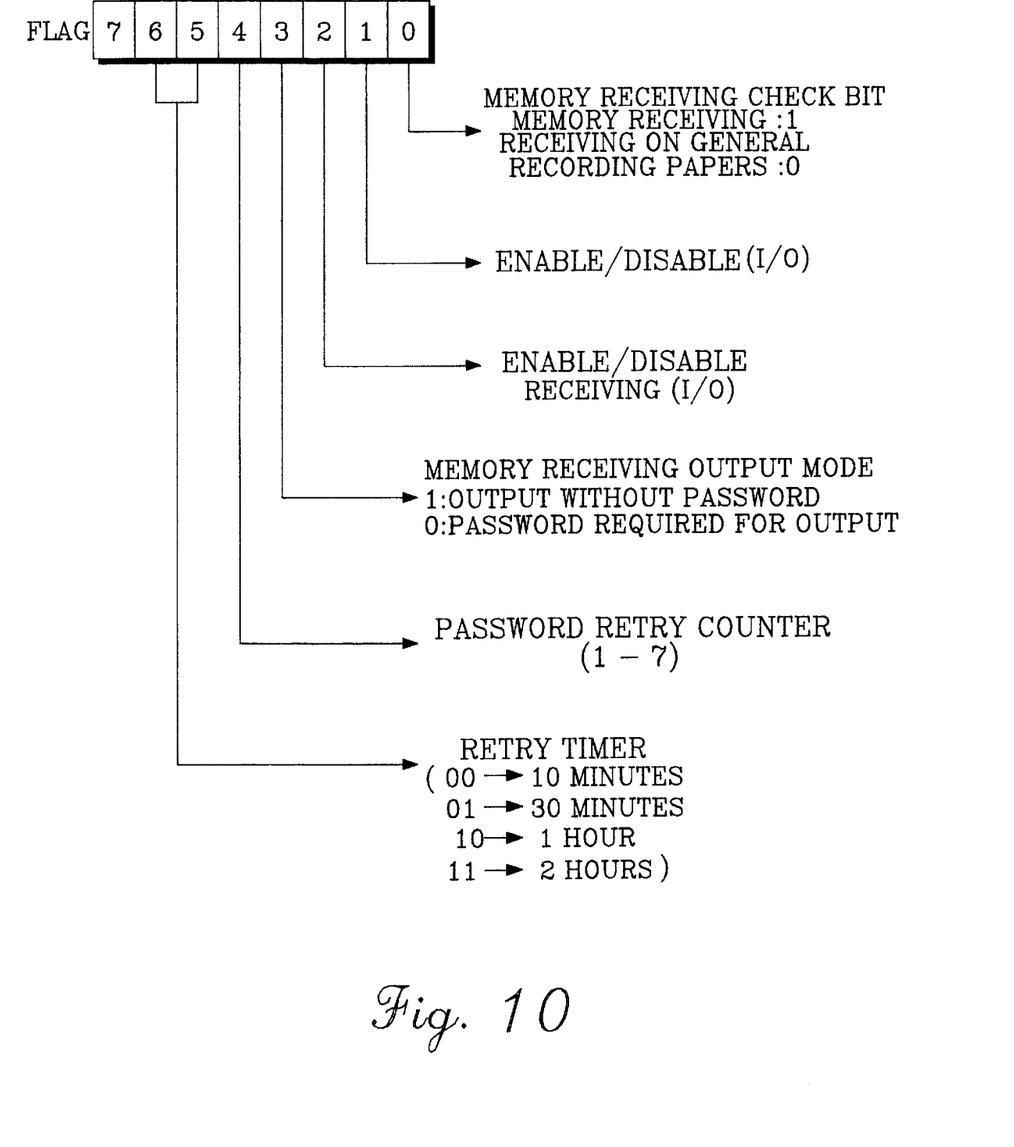
FIG. 10 is an illustration showing designation of option flags according to another embodiment of the present invention.

FIG. 10 is an illustration of the option flag in FIG. 9. When data is received, it is processed as general paper receiving if BIT 0 is 0, while it is processed as memory receiving if BIT 0 is 1. BIT 1 is a bit for checking whether to perform conversion function of output mode by pressing a particular key, while BIT 2 is a bit for determining whether to discard or to paper-receive additionally received data when the corresponding memory is full and no more data can be received. There are two modes in BIT 3: one is a mode in which output of data received by memory is possible only with a password inputted at the time of paper receiving (value is 0); another is a mode in which such output is possible without any password being inputted (value is 1).

BIT 4 is a password retrying counter in which input of a password can be allowed up to 7 times if an incorrect password is inputted for outputting data received by memory. BITs 5 and 6 are time values set for restricting output of data received for a certain time if a password conforming to those within the password retrying counter is not inputted and thus the user is found to be an unauthorized user.

The operation of a receiving mode according to the memory map and option flag of FIGS. 9 and 10 are the same as that of FIG. 6.

Figure 11:
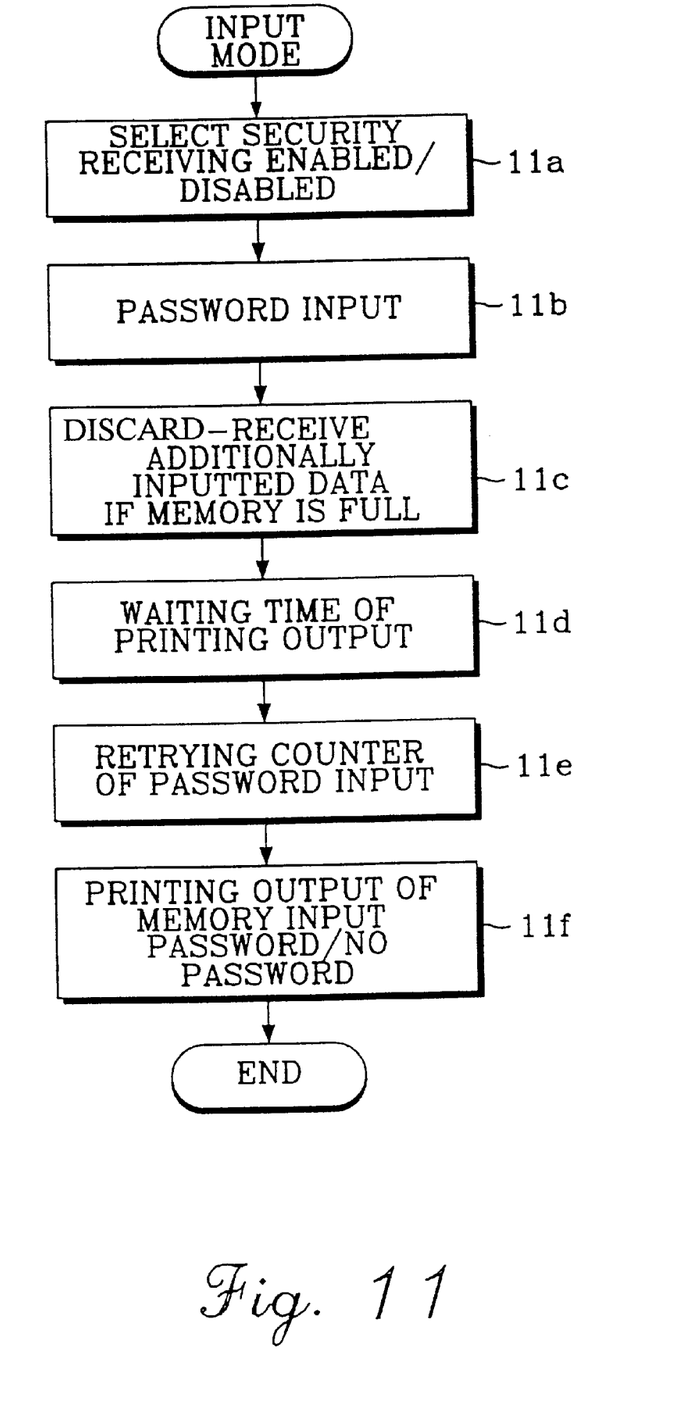
FIG. 11 is a flowchart of an input mode showing how its option flag bit is processed according to another embodiment of the present invention.

FIG. 11 is a flowchart of an input mode of an option flag according to functions shown in FIGS. 9 and 10. An option flag is set in FIG. 11 by going through steps 11a through 11f in the same fashion as steps 5a through 5f in FIG. 5.

Figure 12:
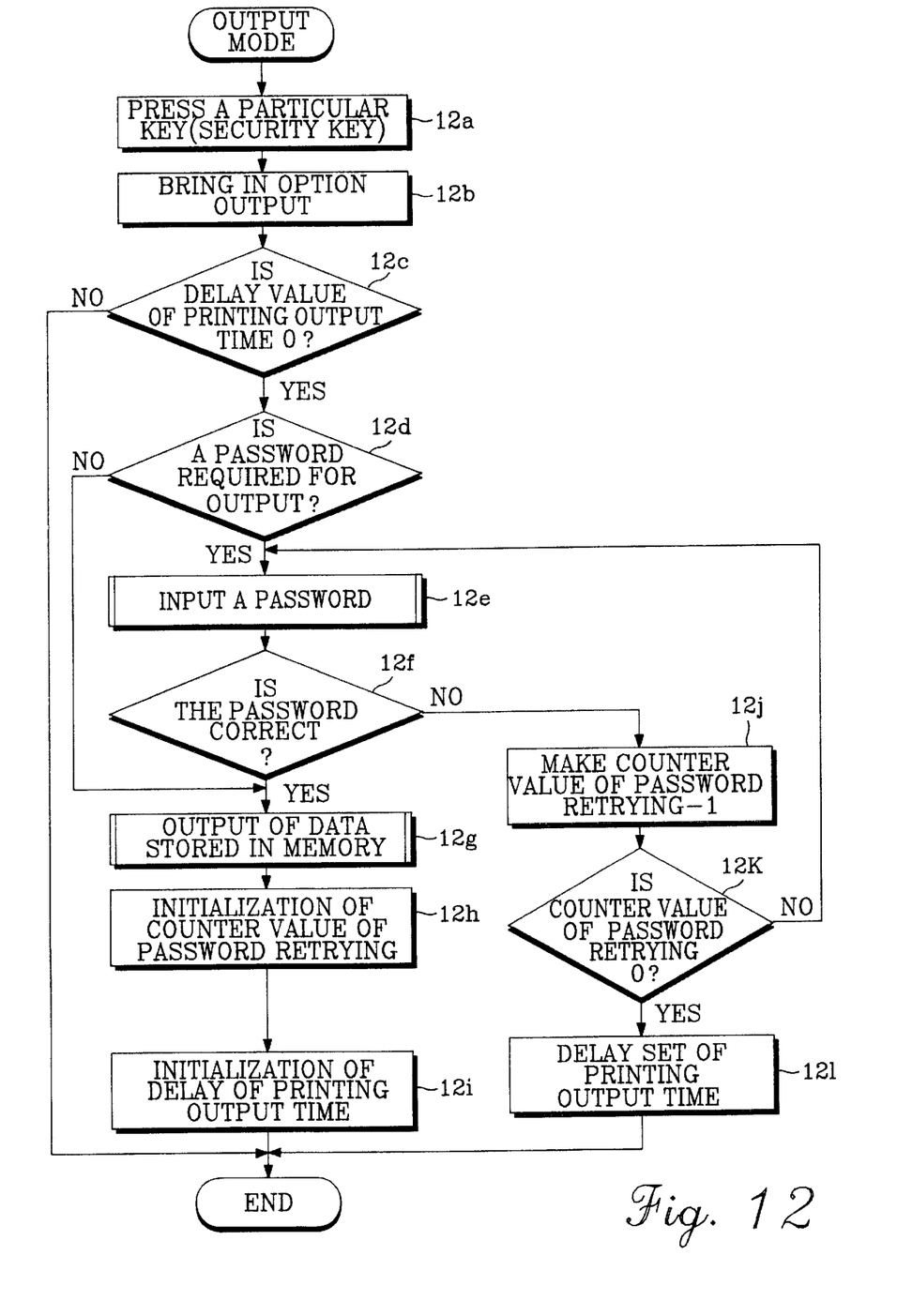
FIG. 12 is a flowchart of an output mode showing how it is processed according to another embodiment of the present invention.

Referring to FIG. 12, a process of the output mode comprises the steps of checking a timer delay value of the printing output for bringing in the option flag by pressing a security key and checking whether the timer delay value is "0", checking if a password has to be inputted for output in the previous step, confirming whether an inputted password coincides with an existing password when the mode requires a password in the previous step, outputting the data stored in memory if a password is correct or no password is inputted, initiating a counter value of password retrying and a delay value of printing output time, making the counter value of password retrying minus (-) if a password is not correct in the previous step, and for setting the delay value of the printing output time if the counter value of the password retrying is in its initial state.

Figure 13:
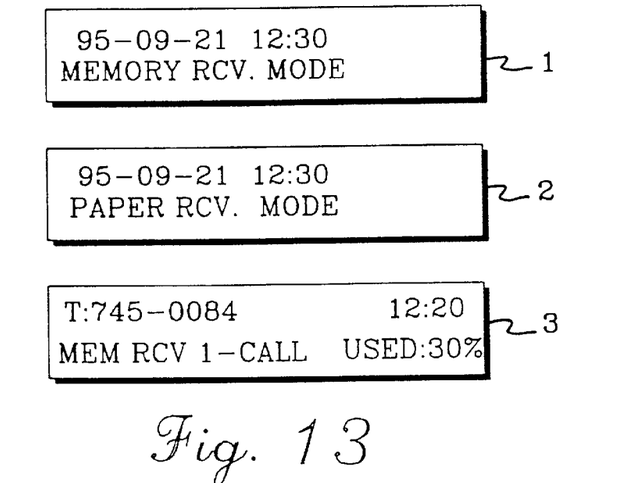
FIG. 13 is an illustration showing function indication according to another embodiment of the present invention.

FIG. 13 is a diagram showing indication of functions in FIGS. 9 through 12 of the present invention, in which reference numerals 1 and 2 are for designating a general paper receiving mode and a memory receiving mode. In order to convert the above memory receiving mode to a general memory receiving mode, a password has to be inputted for security purposes in pressing a particular key, i.e., a security key, and the password inputted has to be correct for conversion. Further, if a general paper receiving mode is converted into a memory receiving mode, a password may be or may not be inputted for conversion, so that a user can have an option to choose.

FIG. 13 is an example of showing operation of functions on an LCD if there is any. Reference numeral 3 refers to memory where messages in a waiting state are shown on an LCD in an order of receiving once data are received. At this time, the telephone number of the last sender, received time, the total number of calls, and the amount of memory used in percent are indicated. In order to confirm where the data has been sent from, left-and-right keys as well as up-and-down keys are pressed to have an LCD similar to the third LCD. The above memory receiving mode and paper receiving mode are stored in a static ram (S-RAM) so that they are not changed even when power is turned on or off. Image data stored in a D-RAM is data which may be erased at any time such as information on the sender which is erased, number of pages, received time, etc. The operation of the present invention as described above is applicable to both a telephone mode (TEL MODE) and an automatic receiving mode (AUTO REC MODE) as well as a telephone mode (TEL MODE) and a facsimile mode (FAX MODE).

Next an output mode in another embodiment of the present invention is described below with reference to FIG. 12. An output mode is a method of outputting image data stored in memory by pressing a particular key, i.e., a security key, in step 12a. To perform this function, an option flag is brought in by pressing the particular key. From the option flag brought in, the CPU 10 confirms whether a delay value of printing output time required for printing output is 0 in step 12c. If the delay value is not 0, the process is completed. If the delay value of printing output time is 0 in step 12c, in order to output data inputted by memory, whether the mode requires a password for input is checked in step 12d. If no password is required for input, data are outputted directly in step 12g, while if a password has to be inputted, it is inputted in step 12e. When the password inputted is correct, data are outputted in step 12g. Further in steps 12h and 12i, a counter value of password retrying and a delay value of printing output time inputted are initiated, and the process is completed. If a password is not correct in step 12f, the counter value of password retrying is made to be −1 in step 12j. Whether the counter value of password retrying is 0 is confirmed in step 12k. If the counter value is 0, the delay value of printing output time is set (option flag bits 5 and 6, 10 minutes/30 minutes/1 hour/2 hours) in step 12l, and the process is completed.

In outputting data received by memory, if any data has been received, there is a method of indicating the receiving in terms of an LCD, an LED, or voice, or it is possible not to indicate any sign for security purposes. Still further, there is a method of pressing a particular key to indicate the receiving. A basic method is that receiving of memory is indicated on an LCD, and a message demanding input of a password is shown upon pressing a particular key. If a password inputted coincides with the initially inputted password, data are outputted, while if it does not, there appears a message saying to return to a waiting state or to reinput.

As described above, the present invention provides advantages in terms of security and convenience in that it is possible to automatically output data received by memory at a particular time set by a receiver when the receiver leaves work, to prevent confidential documents from being exposed to any outsiders when a receiver is not near the facsimile machine, and to automatically output data received by memory at a particular time when a receiver returns to work in the morning. The merit is that these can be done without installing additional hardware devices for a system such as a facsimile machine.

While the invention has been described in terms of preferred embodiments, those skilled in the art will recognize that the invention can be practiced with modification within the spirit and scope of the appended claims.

What is claimed is:

1. In a facsimile machine comprising a central processing unit, a memory an operating panel, a scanner, a modem, a network control unit, a printer, a sensor, and a speaker, a method of processing an input mode of a function selection time comprising the steps of:

inputting a function selection time in order to input a beginning time and a finishing time of memory receiving to receive data received by said memory unit, and to input a printing time;

setting functions for selecting a security function and inputting a password, and for determining a memory receiving mode or an automatic switching range of receiving; and outputting data received, at a time determined by inputting a function selection time and by setting functions, and according to said functions;

the step of inputting a fiction selection time further comprising the steps of:

a first step of inputting a beginning time of memory receiving of said memory unit of said facsimile machine;

a second step of inputting a finishing time of said memory receiving; and a third step of inputting a printing time of data received at said finishing time of said memory receiving.

2. A method of processing an input mode of a function selection time for a facsimile machine as defined in claim 1, said third step being performed by completing printing of data when printing of data received has been set at a time of finishing memory receiving, and by inputting a printing time of data received by memory when printing of data received has not been set at said time.

3. In a facsimile machine comprising a central processing unit, a memory, an operating panel, a scanner, a modem, a network control unit, a printer, a sensor, and a speaker, a method of processing an input mode of a function selection time comprising the steps of:

inputting a function selection time in order to input a beginning time and a finishing time of memory receiving to receive data received by said memory unit, and to input a printing time;

setting functions for selecting a security function and inputting a password, and for determining a memory receiving mode or an automatic switching range of receiving; and outputting data received, at a time determined by inputting a function selection time and by setting functions, and according to said functions;

the step of setting functions comprising the steps of:

setting a security maintenance flnction in which an enable or disable mode for maintaining security of papers received by said facsimile machine is selected;

setting receiving of fill memory by inputting a password if said security maintenance function has been set, and by inputting one of either discard or paper receiving of additionally inputted papers according to remaining storage capability of memory;

setting retrying of a password in which a waiting time of printing output is inputted and a number of retrying of inputting a password during said waiting time is counted;

reinputting of a password in which memory receiving or password inputting is designated according to said number of retrying of inputting a password in said retrying of a password; and setting a receiving mode after output of memory received in which a receiving mode and an automatic switching range of said receiving mode have been set.

4. A method of operating a receiving mode of a facsimile machine, comprising the steps of:

detecting a mode enable in which whether a value of mode enable/disable of memory receiving has been enabled is checked by detecting a ring in said receiving mode and bringing in an option flag if a ring is detected;

confirming a mode of memory receiving in which whether a mode is a memory receiving mode is checked when said value is enabled in said step of detecting a mode enable;

checking a memory state in which whether a memory is full is checked when said mode is determined to be said memory receiving mode in said step of confirming a mode of memory receiving;

memory receiving of data in which data is received and stored in the memory when memory is found not to be full in said step of checking a memory state;

confirming abnormality of papers in which a determination is made as to whether there is any fault in paper setting when a disabled value is detected in said step of detecting a mode enable and said mode is determined not to be said memory receiving mode in said step of confirming mode of memory receiving;

receiving by paper in which data is received by paper if there is no abnormality determined in said step of confirming abnormality of papers and if it has been determined that the memory is full; and confirming discard in which whether data received is to be discarded is checked when the memory is determined to be full in said step of checking a memory state, and if data received is to be discarded, memory receiving is completed, and if data received is not to be discarded, data is received by paper.

5. A method of operating a receiving mode of a facsimile machine as defined in claim 4, the output of image data being stored in the memory of said facsimile machine comprising the steps of:

confirming time coincidence in which a present time and a designated time of memory receiving output are input and checked to see if said times coincide; and outputting memory data in which data received and stored memory is outputted if said times coincide and if there is any call received by memory after checking a total number of calls received.

* * * * *